Dec. 5, 1950   C. V. WOLFE   2,532,981
CHAIN SAW FRAME
Filed Feb. 9, 1946   2 Sheets-Sheet 2
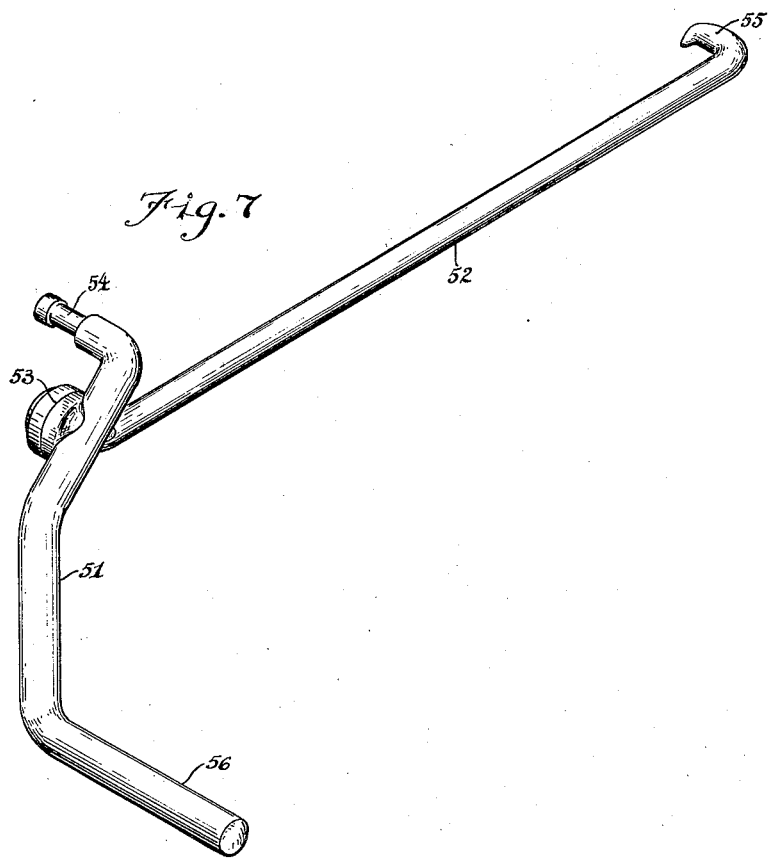
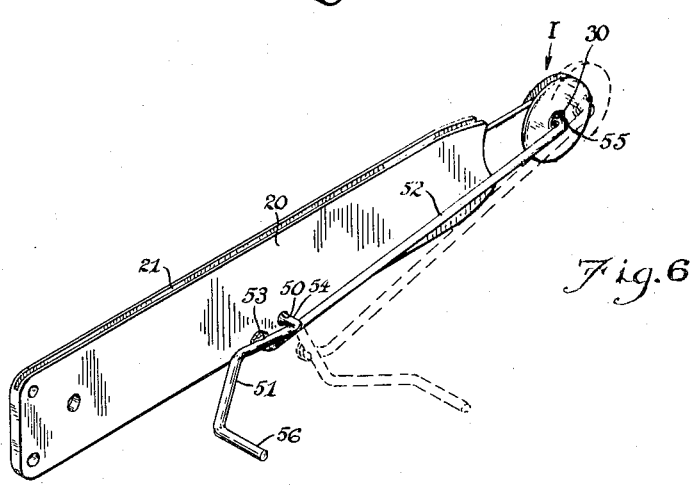
INVENTOR.
Charles V. Wolfe,
BY Hood & Hahn
ATTORNEYS.

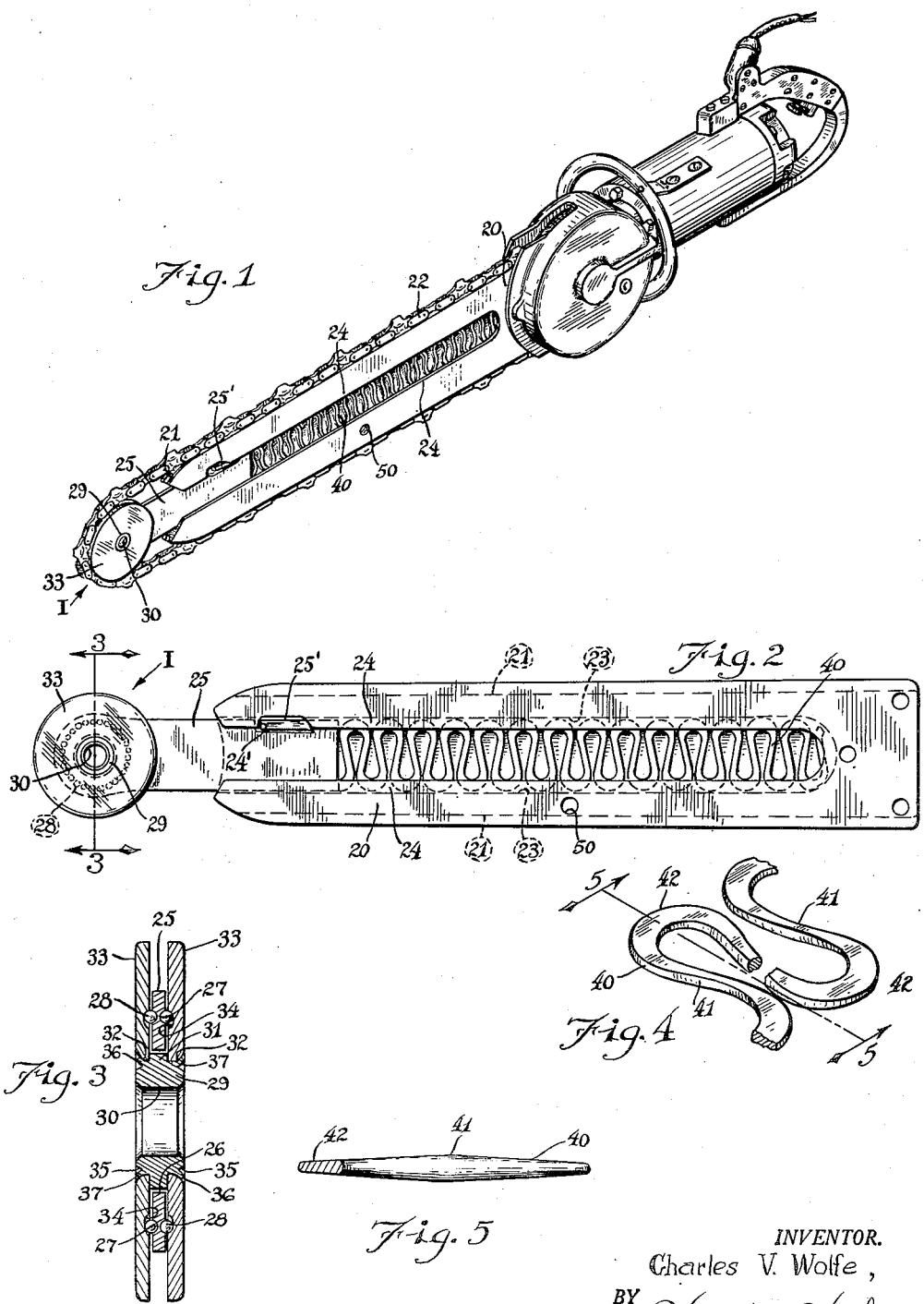

Patented Dec. 5, 1950

2,532,981

UNITED STATES PATENT OFFICE 2,532,981

CHAIN SAW FRAME

Charles V. Wolfe, Indianapolis, Ind., assignor to E. C. Atkins and Company, Indianapolis, Ind., a corporation of Indiana Application February 9, 1946, Serial No. 646,533

6 Claims. (Cl. 143—32)

In power-driven saws of the endless chain cutter type the endless chain cutter is supported on a bar or blade which must be thin enough to pass easily through the kerf made by the cutter, and means should be provided to maintain the endless cutter under proper tension.

The object of my invention is to provide an improved supporting blade for power-driven saws of the endless chain type whereby such a saw may be mounted, demounted, and maintained under a proper degree of tension.

The accompanying drawings illustrate my invention.

Fig. 1 is a perspective view of a complete unit embodying my invention;

Fig. 2 is an elevation of the blade or bar of my invention;

Fig. 3 is a section on line 3—3 of Fig. 2.

Fig. 4 is an enlarged, fragmentary perspective of the spring constituting a feature of my invention;

Fig. 5 is a section taken on line 5—5 of Fig. 4;

Fig. 6 is a perspective view, on a smaller scale, showing the means for mounting or demounting the endless cutter chain; and Fig. 7 is an enlarged perspective of the tool shown as part of Fig. 6.

In the drawings 20 indicates a rigid bar or blade having longitudinal edge grooves 21 for the reception and guidance of the opposite longitudinal runs of the endless chain cutter 22. Medially and lengthwise of blade 20, on one face, is a groove 23 the lengthwise sides of which are overhung by flanges 24, 24. Groove 23 is open at one end, and slidably mounted in this open end is a plate 25 of temperable material and perforated near its outer end at 26. One edge of plate 25 carries a spring finger 25', the free end of which may spring into a notch 24', formed in one of flanges 24, thereby preventing accidental removal of plate 25.

Formed in each face of plate 25 concentric with perforation 26 is a ball race 27 adapted to receive balls 28.

Loosely fitting in perforation 26 is a hub 29 axially perforated at 30. Hub 29 is shouldered at each end to define a middle portion 31 and reduced portions 32, 32, portion 31 having an axial extent substantially equal to the width of the grooves 21 and the overall axial extent being no greater than the width of the saw kerf, i. e., the thickness of blade 20.

Mounted on each reduced portion 32 is a ring 33 of temperable material, in the inner face of which is formed a ball race 34 receiving balls 28.

The radius of the inner walls of races 34 is slightly greater than the radius of the inner walls of races 27 and the radius of the outer walls of races 34 is considerably greater than the radius of the outer walls of races 27 so that the radial thrusts in the bearings will be inwardly on races 34 and outwardly on races 27.

In each end of hub 29 is a shallow groove 35 to provide a ring 36 which is readily distortible radially into the adjacent chamfer 37 of the eye of adjacent ring 33, thus binding the parts 29 to 33 together to form an idler I over which the endless cutter 22 passes from the motor driven pulley at the inner end of the assembly.

Cutter 22 is maintained in proper tension by a spring 40 arranged between the inner end of plate 25 and the closed inner end of groove 23. Spring 40 must possess considerable strength and, in order that it may also be nestable in groove 24, it is of the serpentine type comprising a series of alternately reversely placed U portions. Springs of that type, if formed of wire or rod of uniform cross section, are quite unreliable and liable to rupture because of the unavoidable uneven distribution of stresses under lengthwise compression.

I have found that I can provide a spring of sufficient strength, without the above-mentioned weakness and yet nestable in the limited space available by first forming a serpentine from temperable rod (preferably round in cross section) having a diameter or thickness somewhat in excess of the distance between the bottom of groove 23 and the overhanging flange 24, with the width of the serpentine somewhat less than the total width of groove 23. The opposite edges of the serpentine are then subjected to pressure at a slight angle from normal to the thickness of the rod gradually from a minimum thickness at the middle of each U to a maximum thickness at the medial longitudinal plane of the spring (as indicated at 41) and correspondingly varying the width of the rod from a maximum at the middle of each U (as indicated at 42) to a minimum at the medial longitudinal plane of the spring.

If the rod is initially .150" in diameter, then uniform distortions throughout the length of the spring under lengthwise compression will occur if the thickness 41 is approximately .150" and thickness 42 is .075".

In order to facilitate the introduction of plate 25 into the groove 23 of blade 20, I perforate blade 20 at an intermediate point 50 and provide the special tool shown in Figs. 6 and 7. This tool is in the nature of a toggle comprising the two links 51 and 52 hinged or pivoted together at 53. Link 51 at one end is provided with a laterally projecting finger 54 adapted to hook into perforation 50, and at its opposite end is laterally offset to provide an operating handle 56. The link 52, at its end remote from the pivot 53, is provided with a laterally projecting finger 55 parallel with finger 54 and adapted to be projected into the perforation 30 of idler I.

Spring 40 when uncompressed permits a slight insertion of plate 25 into groove 23, and when in that position, and with link 51 in the dotted line position shown in Fig. 6, fingers 54 and 55 may be projected respectively into perforation 50 and the perforation 30 of hub 29. Thereupon, by swinging link 51 to the full line position shown in Fig. 6, plate 25 may be easily forced inwardly, against the action of spring 40, until its spring finger 25' passes in beyond notch 24', whereupon, finger 54 will have passed a dead center to retain the idler I in a retracted position to permit the cutter chain to be mounted thereon. In case of breakage of the chain, spring finger 25' will move into notch 24' so as to prevent spring 40 from ejecting plate 25.

The maximum axial extent of idler I is less than the saw kerf so that the implement may be retracted longitudinally from any kerf produced by the cutter.

I claim as my invention:

1. For chain saws, a blade having chain-saw guide grooves in its two longitudinal edges and an intermediate longitudinal spring pocket open at one end, said pocket being defined by a continuous web extending between the longitudinal edges of said blade and two longitudinally extending flanges located in a plane parallel with the plane of said web and projecting respectively from said edges toward each other but having their adjacent edges substantially spaced from each other, a plate slidably mounted in the open end of said pocket and provided at its outer end with a chain-saw guide in the same plane as said guide grooves, and a compression spring seated in said spring pocket and engaged for support and guidance between said web and said flanges and acting to project said slidable plate.

2. For chain saws, a relatively thin, narrow and long metal blade having chain-saw guide grooves longitudinally of its side edges, and in one face a shallow longitudinally-extending groove open at one end of the blade, the longitudinal sides of said last-named groove being overhung by flange portions of the blade projecting from said side edges toward each other, a plate slidably mounted in the open end of said last-named groove, and a chain guide carried by the outer end of said plate in the plane of said guide grooves.

3. For chain saws, a relatively thin, narrow and long metal blade having chain-saw guide grooves longitudinally of its side edges, and in one face a shallow longitudinally-extending groove open at one end of the blade, the longitudinal sides of said last-named groove being overhung by flange portions of the blade projecting from said side edges toward each other, a plate slidably mounted in the open end of said last-named groove, concentric ball races formed in the side faces of said plate near its outer end, two axially spaced disks forming a chain-saw guide and each having on its inner face a circular race mating with one of said ball races, means securing said discs against relative axial movement and mounting said discs on said plate, and two series of bearing balls interposed between the plate and disks in said ball races.

4. The combination of claim 1 in which one flange of said pocket is provided, near the open end of said pocket, with a notch, and a resilient finger on said plate, engageable in said notch when said plate is in operative position, to limit outward movement of said plate under the influence of said spring.

5. The combination of claim 4 in which the end wall of said notch remote from the open end of said pocket is inclined to the line of movement of said plate to permit movement of said finger beyond said notch end in a direction away from said open end of said pocket.

6. The combination of claim 2 including a compression spring confined in said shallow groove by said plate, and a spring finger carried at one edge of said plate, that flange associated with said one plate edge providing an abutment cooperative with said finger to limit movement of said plate under the influence of said spring.

CHARLES V. WOLFE.

REFERENCES CITED

The following references are of record in the file of this patent:

UNITED STATES PATENTS

| Number | Name | Date |
|---|---|---|
| 345,767 | Buckley | July 20, 1886 |
| 917,450 | Jones et al. | Apr. 6, 1909 |
| 1,016,664 | Bailey | Feb. 6, 1912 |
| 1,175,302 | Salee | Mar. 14, 1916 |
| 1,317,812 | Noble | Oct. 7, 1919 |
| 1,386,413 | Lavoie | Aug. 2, 1921 |
| 1,495,492 | Linebaugh | May 27, 1924 |
| 1,526,483 | Lombardo | Feb. 17, 1925 |
| 1,903,776 | Clark et al. | Apr. 18, 1933 |
| 2,178,553 | Bowie | Nov. 7, 1939 |
| 2,316,997 | Smith | Apr. 20, 1943 |

FOREIGN PATENTS

| Number | Country | Date |
|---|---|---|
| 240,733 | Great Britain | Oct. 8, 1925 |
| 521,611 | Great Britain | May 27, 1940 |